United States Patent [19]

do Valle

[11] 3,990,181

[45] Nov. 9, 1976

[54] NOVEL IRRIGATION SYSTEM AND METHOD FOR ITS APPLICATION

[76] Inventor: Fernando Ribetro do Valle, Rua Major Sertorio 200, 3rd Floor, Sao Paulo, Brazil

[22] Filed: Apr. 15, 1974

[21] Appl. No.: 461,138

Related U.S. Application Data

[63] Continuation of Ser. No. 381,433, July 23, 1973, abandoned, which is a continuation of Ser. No. 146,769, May 25, 1971, abandoned.

[30] Foreign Application Priority Data

May 25, 1970 Brazil.................................. 219252

[52] U.S. Cl..................................... 47/58; 47/48.5
[51] Int. Cl.²......................................... A01G 25/02
[58] Field of Search ..................... 47/48.5, 58, 9, 1 R, 47/DIG. 4, DIG. 13, 17; 61/12, 13, 72.1; 111/1, 6; 37/91

[56] References Cited

UNITED STATES PATENTS

| 640,077 | 12/1899 | Bagby ................................. 47/48.5 |
| 968,226 | 8/1910 | Ziller ............................... 47/48.5 X |
| 1,200,869 | 10/1916 | Rife ...................................... 61/13 |
| 1,204,637 | 11/1916 | Anson............................. 47/48.5 X |
| 1,231,308 | 6/1917 | Steelquist......................... 47/48.5 X |
| 1,604,189 | 10/1926 | Nelson............................ 47/48.5 X |
| 1,846,902 | 2/1932 | Powell ................................... 37/91 |
| 2,052,020 | 8/1936 | Black .................................. 47/48.5 |
| 2,653,449 | 9/1953 | Stauch .................................. 61/13 |
| 3,046,747 | 7/1962 | Timpe............................... 47/48.5 |
| 3,479,825 | 11/1969 | Hellstrom ............................ 47/9 X |
| 3,556,026 | 1/1971 | Houston............................. 47/9 X |

FOREIGN PATENTS OR APPLICATIONS

| 37,808 | 1/1931 | France............................. 47/48.5 |
| 657,104 | 7/1928 | France............................. 47/48.5 |
| 625,540 | 1/1936 | Germany ......................... 47/48.5 |

OTHER PUBLICATIONS

*Vegetable Crops* by Homer C. Thompson and William C. Kelly 1957, 5th Edition Chapt. 5, p. 67, McGraw–Hill Book Co., New York.
*The Nature and Properties of Soils* by H. O. Buckman and N. C. Brady, The Macmillan Co., 7th Ed. 1969, Chapt. 17, p. 491.
N.Y. Times, Sunday May 17, 1959, Section 2, p. 24, "Subsoil Watering Spurs Tomatoes".

*Primary Examiner*—Edgar S. Burr
*Assistant Examiner*—James R. Feyrer
*Attorney, Agent, or Firm*—Karl F. Ross; Herbert Dubno

[57] ABSTRACT

A row crop such as coffee plants is irrigated and fertilized by excavating the ground along each row of the crop to form a trench in which unglazed drainage tiles are laid in a row with cement-sand joints, covering the tile with soil and then applying in unsuccessive layers, phosphate fertilizer, soil, a straw and fertilizer mulch and soil to just below the top of the trench. Soil is embanked along the edge of the trench. Risers are provided at each end of the tile row and a riser is filled with water to allow the same to percolate toward the plants.

1 Claim, 4 Drawing Figures

FERNANDO RIBEIRO DO VALLE
INVENTOR.

BY  Karl F. Ross

ATTORNEY

FERNANDO RIBEIRO DO VALLE
INVENTOR.

BY Karl F. Ross
ATTORNEY

NOVEL IRRIGATION SYSTEM AND METHOD FOR ITS APPLICATION

This is a continuation of application Ser. No. 381,433, filed July 23, 1973, now abandoned which was a continuation of application Ser. No. 146,769, filed May 25, 1971, now abandoned.

Almost from the beginning of his existence upon earth man has striven to control water supplies in order to obtain better and more plentiful crops from the soil he cultivates. More recently, population growth has presented mankind with problems never before imagined of food production that are directly linked to its own survival on this planet.

Thus, after being a matter of local concern in various areas of the world for many generations, agricultural improvements have become a major topic of discussion among representatives at United Nations meetings. The need to search for better answers to the problems of man's survival has united great and small nations in a common effort, and this in turn may open avenues to better understanding among all peoples of the world, no matter what their beliefs or skin tones. In this respect, much has already been done by the United Nations Organization FAO, since it has always tried to pass along the best knowledge available on modern techniques of soil cultivation and improvement, thus benefiting millions of people in many underdeveloped countries.

History repeats itself, and many times the solutions to overwhelming problems have been found to reside in surprisingly simple yet ingenious ways. It thus does not come as a shock that the problem of soil fertility may be solved by someone who has dedicated all of his best efforts to its cultivation by trying to uncover its mysteries and peculiarities through continuing love and interest.

This discovery has been made in nature's own laboratory, the soil. It is as if the earth itself wanted one of its own true friends to reveal the secret hidden from man's knowledge for centuries: that the soil can provide the means for its own regeneration and improvement. Mankind will thus have at its disposal from now on a very simple and efficient means for soil irrigation using drain tiles made of clay in a system that constitutes a novel and revolutionary process of underground irrigation. This will provide farmers with an irrigation system carefully designed to eliminate the uncertainties resulting from unpredictability of rainfall in the course of a year for a given area.

An object of the present invention is to provide a novel irrigation system and method to solve the major problem in soil cultivation posed by rain failure and its many implications for the lives of farmers as well as consumers, the first because of harvest losses and the latter because of the inevitable increase in food prices that follows.

In essence, the system of the present invention comprises the laying down of hollow drain tiles under the soil surface beside the plant roots in order for the latter to absorb the water pouring from said hollow drain tiles through exudation. In other words, the system of the present invention is directed towards a parsimonious water feed to the plants underground.

As is well known, soil irrigation systems are in essential details quite similar to urban water supply systems. Both systems are generally divided into the steps of:

a. water source provision;
b. water storage; and
c. water distribution.

The urban water distribution is through an underground pipeline from which the water is transferred in smaller pipes to the individual consumer. In soil irrigation systems the water is taken to the plants in any of the following ways:

a. through sprinklers where water is distributed as artificial rain;
b. through infiltration where water is distributed by means of furrows;
c. through flooding where water is distributed evenly over the entire surface of the soil; and
d. through the underground where water is injected into the soil in order to form an artificial layer or to control an already existing layer.

The irrigation system of the present invention differs substantially from all the above systems since only one small soil strip receives the water through the drain tiles buried into the ground like a reservoir to which the roots go for water, this working in all aspects in the same fashion as the water distribution system of any city.

The system of the present invention is based upon the fact that water has a surface tension that brings forth capillary action and that drain tiles, even the best ones, permit a certain degree of infiltration in addition to a limited leakage at the joints after installation, especially when the tiles are sealed together with cement and sand mixtures. As a matter of fact, this type of drain tile presents the following drawbacks whenever used as liquid conductor:

a. Roots are permitted to infiltrate through the joints and develop further in the interior when the ooze is continuous.
b. Because of porosity the tiles allow for the escape of water through their walls especially during prolonged dry spells.
c. The drain tiles normally suffer considerable leakage of water being circulated under pressure.

With the above data in mind a tile pipeline was constructed with an outer diameter of 4 inches in the same way as a normal water distribution system through 1,470 coffee stems planted in rows. In this manner all of the coffee stems were reached in a way similar to that of houses in a city receiving their water supply from a main distributing pipe passing beneath the street centerline. In the irrigation process, the roots act as connecting means and even if they do not reach the drain tiles they enter the wet field created by the water oozing from the drain tiles.

In accordance with technical specifications the drain tiles made of clay should not permit leakage under pressure of 0.7 kg/cm$^2$, corresponding to a water column about 7 meters high. Since the terrain where the experimental tile pipeline was installed had a 4 meter slope it was assumed that no effect would appear although the following actually took place:

a. The drain tiles installed in the lower part of the terrain sustained greater leakage;
b. The amount of water available was not enough to keep the system filled;
c. The drain tiles in close contact with the soil had greater leakage than anticipated.

In view of these results, the system was modified so as to leave each row independent from all the others. Upright drain tiles were installed at both ends of each row in order to control the filling and draining of water individually.

It was found that any increase in water input caused a corresponding flow increase by virtue of the water column elevation and consequently a greater water pressure was exerted on the system. Keeping the water in the column at a certain level resulted in a practically constant outflow; e.g., the flow in one of the pipelines having a column 1.40 m high was about 5,000 liters per hour over a distance of 100 meters. Thus a larger area could be irrigated in a shorter time simply by raising the height of the water column. Water availability should, of course, be in excess of what is actually required for irrigation.

The present invention will now be described in one of its embodiments with reference to the accompanying drawing wherein.

In accordance with the present invention, the irrigation system consists of multiple drain tile pipes at a certain underground level, preferably where there is a substantial aggregation of feeder roots and passing through the center line of the plant rows. Water coming from any available source, with or without added fertilizers, flows through the interior of the piping and exudation reaches the zone of substantial aggregation of feeder roots however, if desired this drain tile may also be used independently and filled with water as required for a specific purpose. Here again the water may or may not contain fertilizing solutions.

Common unglazed clay tiles, preferably 4 inches, of the type normally used at urban drainage facilities are the sole components of the hollow irrigation piping of the present invention; the joints, cracks and fractures are sealed with a cement and sand mixture plaster. The pipes are laid down parallel to the rows of coffee or other plants.

Figure 3:
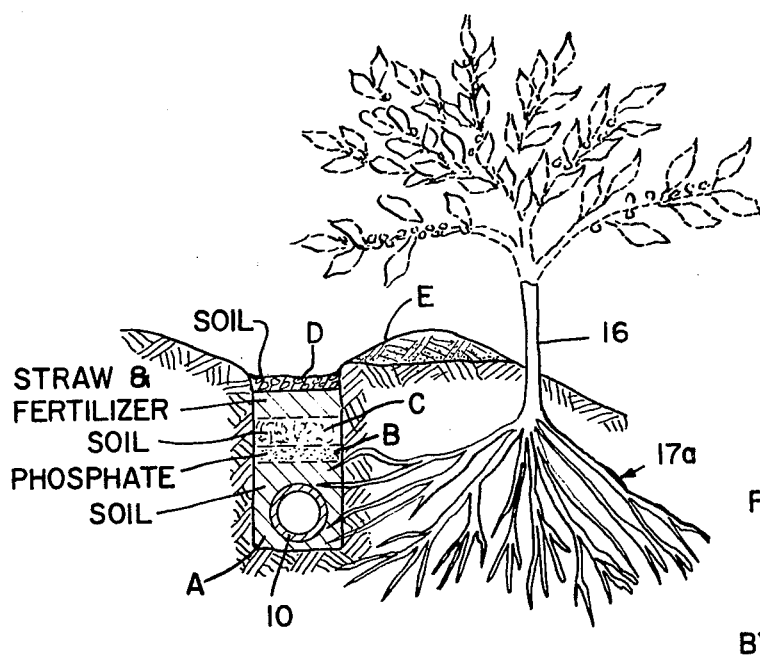
FIG. 3 is a transverse sectional view of a drain tile in its underground position.

The following precautions apply to a coffee plantation irrigation system:

a. The tile pipes should be kept at the same underground level whenever possible in order for the flow to remain constant from one end of a pipe to the other;

b. The tile should not necessarily be laid in a straight line but rather following the terrain bends and level curves;

c. At each end of a tile pipe there should be installed an upright tile for water filling and control. Whenever the water volume is increased the water column should also be raised, this causing a flow increase throughout the entire line because of pressure increase;

d. Filling the trench after the pipe installation is done by a different technique and comprises restoring with the soil A itself up to 5 cm above the upper surface of the tile 10 (see FIG. 3), then adding approximately 400 grams of natural phosphate for each coffee plant in a layer B, followed by about 10 cm of the original soil in a layer C, then a layer D composed of cow or chicken manure mixed with any sort of straw or coffee straw and with a vegetable cake, e.g., castor bean. That last straw- or mulch layer of 12 cm thickness has a double purpose:

i. to serve as a damper for the water exuding from the drain tiles and to weaken its tendency to climb out through a texture that presents empty capillary pore spaces with a wider diameter because the manure-and-straw mixture has characteristics of liquid absorbing up to 3 times its own physical volume;

ii. to direct the roots towards the trench in accordance with the natural tendency of roots to reach for areas containing manure and/or moisture, thus practically teaching the roots to absorb water from the drain tiles as soon as the latter are thus filled.

Above the manure layer comes the final layer D, made of about 10 cm of earth in a plane lower than the natural terrain. The intersecting longitudinal angular border resulting from the last filling task is then chamfered. Excess earth E should not be left on the trench surface but rather heaped up along the longitudinal trench line downstream in order to serve as added soil protection. This protective heaping prevents excess water from displacing the manure layer by means of water retention on the trench spot where permeability is greater and consequently increases the manure's nutritive action through water infiltration at that spot.

The irrigating water may be brought to the water columns from a reservoir by means of gravity or pumping and using small-diameter pipes.

From the very beginning of the irrigation studies it was proposed for the critical dry months to supplement the supply by tanks trucks in order to provide the irrigated areas with a minimum wetting corresponding to 10 mm of rain, i.e., 25% of optimum index for the dry months or 40 mm of rain. This amount is easily provided because the evaporation loss is quite small. The earth moisture on the irrigated terrain was tested with the use of material taken from the trenches through molding. The molding was done on the soil after filling the pipes with water.

Fertilizers were added to the irrigating water on each of the 4 irrigating shifts, using in this instance ammonium sulphate and potassium chloride in the recommended proportions per plant quantities.

On the other hand, the solution may be either alkaline or acid. For example, if it is desired to attack the natural phosphate put on the soil, an acid solution having a concentration of about 2 to 5 per thousand of either nitric or sulfuric acid may be used. For alkaline soil I may directly use ammonia ($NH_3$) which, at present, is the cheapest formula N fertilizer since it is the raw material of industrial nitro fertilizers. On a phosphate fertilization phosphoric acid may be used and on potassic fertilization the substance may be potassium chloride and perhaps even caustic potassium (KOH), depending upon the circumstances of liquid fertilization; however, a fertilization covering will probably still be required.

Besides $NH_3$ a liquor containing $(NH_4)_2NO_3$ which will probably be cheaper than the dehydrated material can be used in mixture with kaolin or with dolomite calcium. Transportation and use would be identical to liquid caustic soda in industrial applications. All that is needed is an appropriate storage facility avoiding the use of bags and consequently the danger of explosion.

Pre-solution is prepared in drums and then added to the irrigation water through a siphon and a small-diameter plastic tube. If desired certain nemanticides, insecticides or systemic fungicides or some radioactive fertilizing foods can be added for better control of plant culture.

It can be seen that the conduit 10 is composed of separate tiles 11 connected to each other at cemented joints 12. At each end there is provided an elbow 13 which leads from the horizontal conduit section to a vertical tile 11 forming a reservoir 14 and adapted to be filled with water as described above. Of course only one end of the conduit 10 need be provided with such a vertical branch 14.

Figure 1:
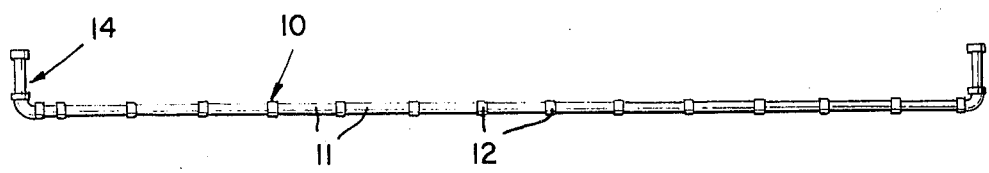
FIG. 1 is a side elevational view of an irrigation line made in accordance with the present invention.
Figure 2:
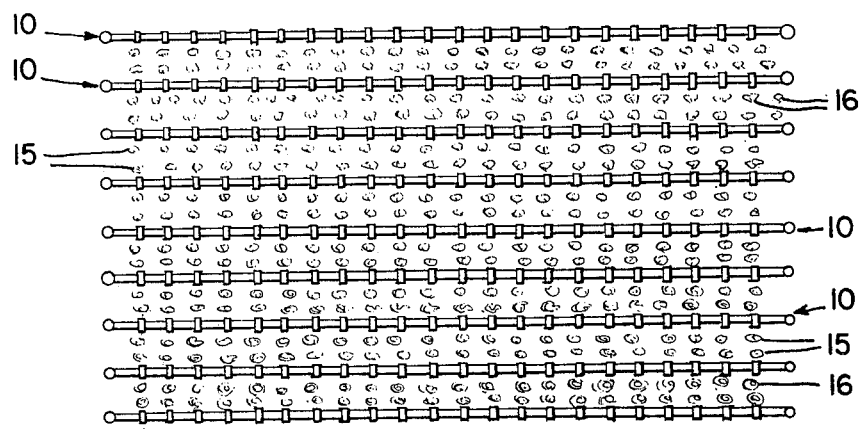
FIG. 2 is a top plan view of the irrigation line of the present invention installed in horizontal rows throughout a plantation.
Figure 4:
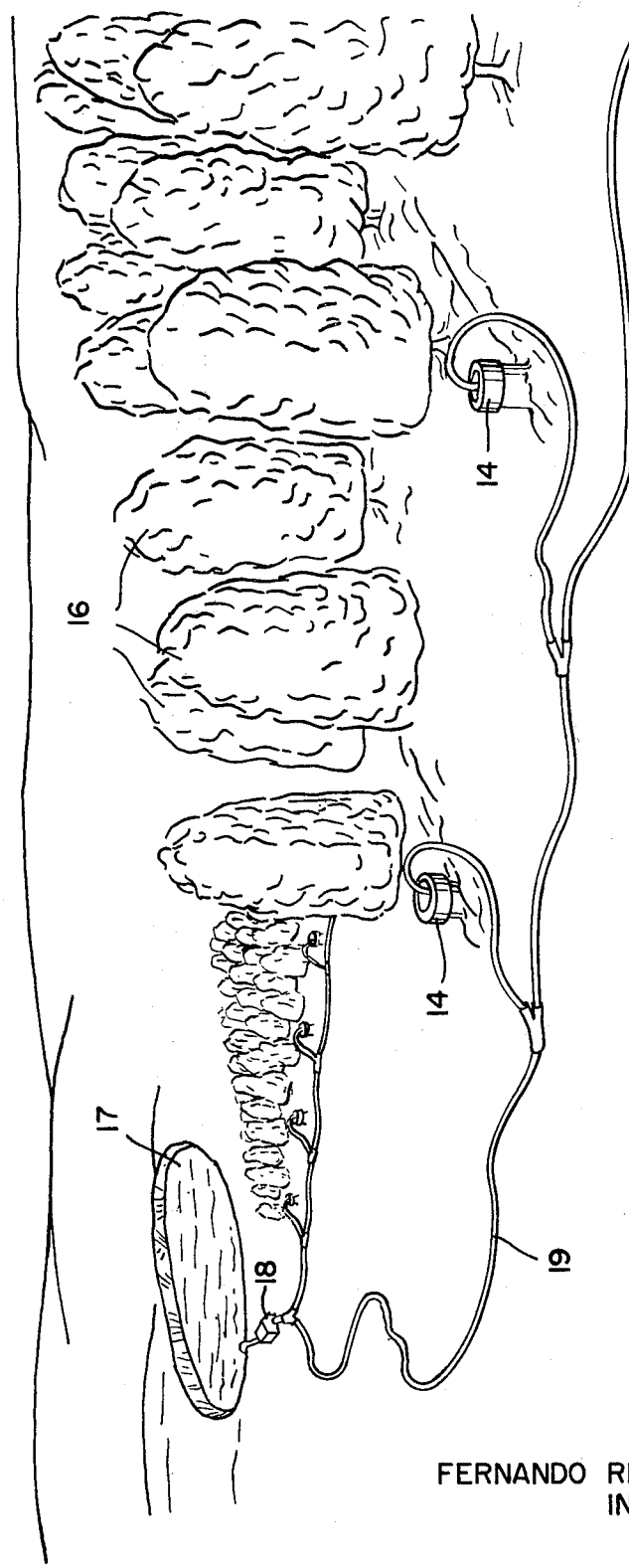
FIG. 4 is a general view of an embodiment of the invention showing the water columns and the tubing used to convey water from a nearby reservoir.

The rows 15 of coffee plants 16 are each arranged adjacent a conduit 10 so that each root structure 17 lies adjacent the conduit 10. A conduit 10 can be arranged adjacent each row 15, as in FIG. 2, or one conduit 10 can extend between two rows and serve to feed these two rows, as in FIG. 4. In either case it is advantageous to bed the conduit 10 in the soil-phosphate-soil-fertilizer strate described above.

The upright branches 14 are all filled either just with water pumped from a water source 17 by a pump 18 through hoses 19 to form the static heads in the reservoirs 14. Liquid fertilizers as described above can also be diffused with the water through the walls of the conduit.

I claim:

1. A method of irrigating a field of rows of plants comprising the steps of:
    excavating trenches in the soil along each plant row;
    laying in each trench a row of porous-wall unglazed drainage tile having cement-sand joints and positioning each row of drainage tile at a constant level independent of the surface terrain;
    completely surrounding the tile in each trench with soil;
    depositing a layer of phosphate above the soil surrounding the tile in each trench;
    depositing a layer of soil above the layer of phosphate in each trench;
    depositing a layer of straw containing fertilizer in each trench above the last-mentioned soil layer and all along the tile, each row of tile having risers at each end extending above grade;
    completely filling each trench above said layer of straw-containing fertilizer with soil to a level just below grade;
    embanking earth along the filled trench and between the latter and the respective plant row;
    filling said risers and each row of tile with water to permit the water to percolate from the tiles and at their joints with only the static pressure provided by the water head in said risers; and
    refilling said risers from time to time.

* * * * *